United States Patent [19]
Foulds

[11] 3,850,353
[45] Nov. 26, 1974

[54] BACKREST AND LUGGAGE CARRIER ASSEMBLY FOR MOTORCYCLES

[76] Inventor: Jerry W. Foulds, 11801 Fremont, Kansas City, Mo. 64134

[22] Filed: June 4, 1973

[21] Appl. No.: 366,702

[52] U.S. Cl. .................. 224/31, 224/30 R, 280/202, 280/289, 297/DIG. 9
[51] Int. Cl. ............................ B62j 7/04, B60n 1/06
[58] Field of Search ........ 224/31, 39 R, 30 R, 32 R, 224/42.07; 297/DIG. 9, 243, 283; 280/202, 289

[56] References Cited
UNITED STATES PATENTS
| 1,168,253 | 1/1916 | Friel | 297/DIG. 9 UX |
| 2,531,902 | 11/1950 | Baron | 280/289 UX |

Primary Examiner—Robert J. Spar
Attorney, Agent, or Firm—Schmidt, Johnson, Hovey & Williams

[57] ABSTRACT

A pair of identical, open-ended mounting tubes are affixed to the frame of the motorcycle on opposite sides of the seat thereof and extend in substantially horizontal relationship. The forward ends of the tubes may receive the legs of a backrest for the operator of the vehicle, while the rear ends of the tubes may alternatively receive the legs of a luggage carrier, a passenger backrest, or a combination passenger backrest and luggage carrier. All of the components mountable within the tubes are readily removed therefrom and replaced thereon as need be, and means is provided to vary the extension of such components from the tubes in order to adjust the components for comfort.

14 Claims, 4 Drawing Figures

PATENTED NOV 26 1974 3,850,353

BACKREST AND LUGGAGE CARRIER ASSEMBLY FOR MOTORCYCLES

This invention relates to accessories for vehicles such as bicycles and motorcycles, and is particularly directed to accessories such as backrests and luggage carriers for larger motorcycles that are often ridden for prolonged periods of time such as during cross-country travel.

Most motorcycles currently available are not provided with accessory items such as backrests, luggage carriers, bed-roll supports, and saddlebags as standard items. Instead, it is most often left to the discretion of the motorcycle purchaser whether or not to obtain such accessories as separate items and add them to his motorcycle. One problem with such an arrangement, however, is that accessories heretofore obtainable were of such design that they were substantially permanently mounted in place on the motorcycle, or at least rendered difficult and time-consuming to remove from the motorcycle and replace them thereon if such was desired.

This can be a significant factor because the cyclist often has different uses for his motorcycle which may require the services of certain accessories but not others. For example, where the motorcycle is to be used only locally for short distances, the cyclist is not likely to require the need of a backrest. On the other hand, where a long trip is planned, the provision of a backrest associated with the seat can aid substantially in reducing fatigue during the cross-country travel. Moreover, the cyclist may or may not want to carry a passenger who, for long trips, would also require the use of a backrest. In addition, there may be many instances where a luggage carrier or rack is necessary or desirable, while in other situations, the addition of this extra component simply is not required.

Another problem is that conventionally, accessory items must be specifically sized for the dimensions of the particular motorcycle on which the accessories are to be mounted. Because motorcycles are available in a countless number of sizes, the expense required to stock accessory items for each of the popular sizes can be considerable, thus rendering the overall costs of such accessories appreciably greater than would otherwise be the case.

Accordingly, it is one important object of the present invention to provide means by which a variety of selected accesories, such as backrests and luggage carriers, can be quickly and easily mounted upon and removed from a vehicle such as a motorcycle or bicycle in order to render the vehicle quickly adaptable for use as dictated by the particular situation at hand.

Another important object of this invention is to obtain the above flexibility through structure that can be readily added to existing motorcycles presently in public use so as to eliminate the need for purchasing a new motorcycle equipped with such capability.

An additional important object of the present invention is to provide the desired flexibility set forth in the two foregoing objects without sacrificing structural rigidity and sturdiness as well as personal safety.

A further important object of the present invention is to eliminate the need for stocking extensive amounts of the accessory items themselves in order to accommodate motorcycles of diverse sizes, by providing special mounting members for the accessory components, which members can themselves be specially sized for various motorcycles while used in connection with components of a single, universal size.

Figure 4:
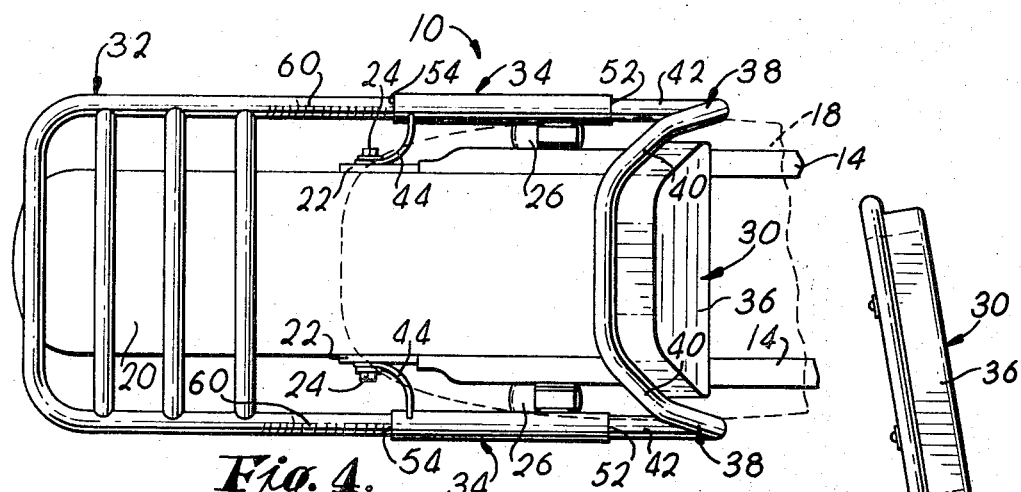
FIG. 4 is an enlarged top plan view of the FIG. 1 assembly, the outline of the seat of the motorcycle being indicated by dashed lines.
Figure 3:
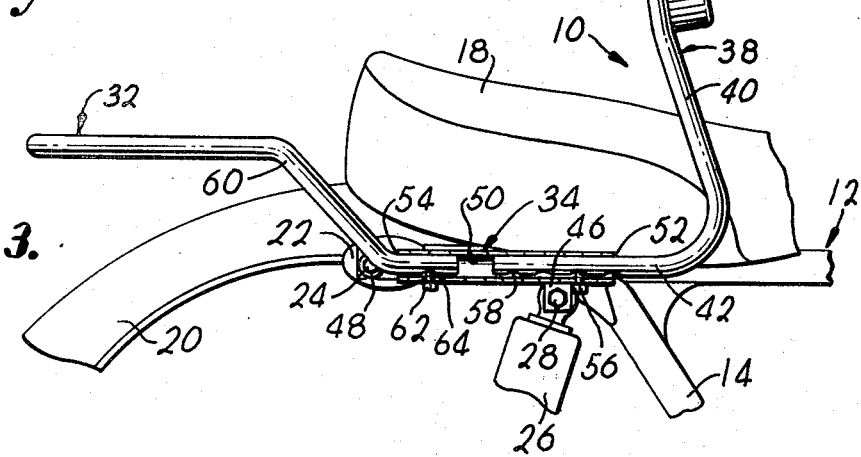
FIG. 3 is a slightly enlarged, side elevational view of the assembly of FIG. 1, showing parts of the assembly in cross-section for clarity.

The backrest and luggage carrier assembly 10 of the present invention is illustrated in use on a motorcycle 12 having a normally fore-and-aft extending frame 14 supported by a pair of ground-engaging wheels 16 (one only being shown). An elongated, bench-type seat 18 is mounted on frame 14 adjacent the rear thereof, and a fender 20 overlies wheel 16 supported by frame 14. As shown best in FIGS. 3 and 4, frame 14 has a pair of flat, rearwardly projecting extensions 22 on opposite sides of frame 14 that receive a pair of fastening bolts 24 for the fender 20. Each side of frame 14 is also provided with a shock absorber 26 adjacent wheel 16 that extends upwardly from the axle (not shown) of wheel 16 for connection to frame 14 through a fastening bolt 28.

Figure 1:
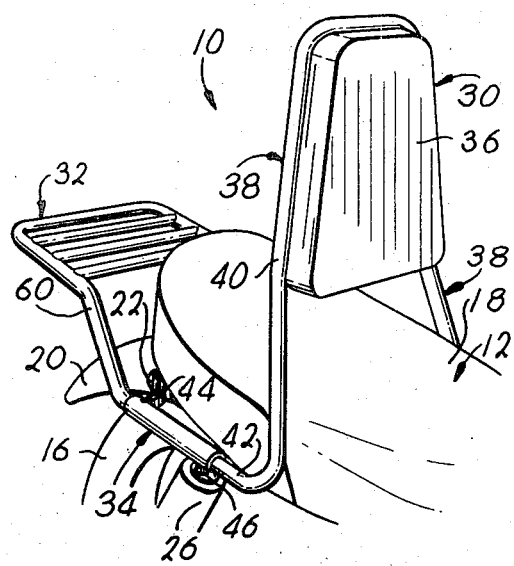
FIG. 1 is a front perspective view of one form of a backrest and luggage carrier assembly made in accordance with the teachings of the present invention and mounted on a motorcycle.

In the form illustrated in FIG. 1, assembly 10 includes a backrest component 30 for the operator of the motorcycle 12, a luggage carrier component 32, and a pair of special mounting tubes 34 on opposite sides of frame 14 that mount the backrest 30 and the luggage carrier 32 in place. Dealing first with the operator backrest 30, the latter is provided with a cushion 36 supported in spaced relationship above seat 18 by a pair of formed, tubular legs 38, each of which is generally L-shaped, having a normally vertical, upper section 40 and a normally horizontal, lower section 42. The legs 38 straddle the seat 18 on opposite sides thereof and are curved rearwardly at the junction of upper and lower sections 40 and 42 respectively. The curved junction thus provides a degree of flexure for the upright portion of the backrest 30 when the latter is installed in order to provide comfortable, yieldable support for the operator.

Each of the elongated tubes 34 has a pair of mounting lugs 44 and 46 that are spaced apart longitudinally on the tube 34 for attachment to the frame 14 at bolts 24 and 28. The rear lug 44 is arcuate, having a downwardly opening slot 48 (shown only in FIG. 3) that is adapted to slip over the shank of bolt 24 so that the lug 44 can be clamped between the head of bolt 24 and the proximal flat extension 22. The forward lug 46 of each tube 34 is downwardly projecting, having an opening (not shown) for the bolt 28 whereby each tube 34 is rigidly affixed to the frame 14 at a pair of spaced-apart locations.

Each tube 34 has an internal bore 50 and is provided with a pair of front and rear open ends 52 and 54 respectively. The lower sections 42 of backrest 30 are inserted into bore 50 through front ends 52 so that the tubes 34 telescopically receive sections 42 for easy removal of the backrest 30. A front adjustment setscrew 56 (FIG. 3) may be provided that projects into bore 50 from the exterior of each tube 34 for mating engagement with one or more dimples 58 in the exterior of section 42. Thus, the position of backrest 30 may be adjusted longitudinally of seat 18 through release of the setscrews 56 and retightening thereof into a selected dimple 58.

The luggage carrier 32 is similar to backrest 30 in that it too has a pair of opposed legs 60 that are disposed on opposite sides of seat 18 and are inserted into the rear ends 54 of tubes 34. Legs 60 fit slidably within tubes 34, and a setscrew 62 for each tube 34 projects into bore 50 for retaining engagement with a dimple 64 in the proximal leg 60.

Figure 2:
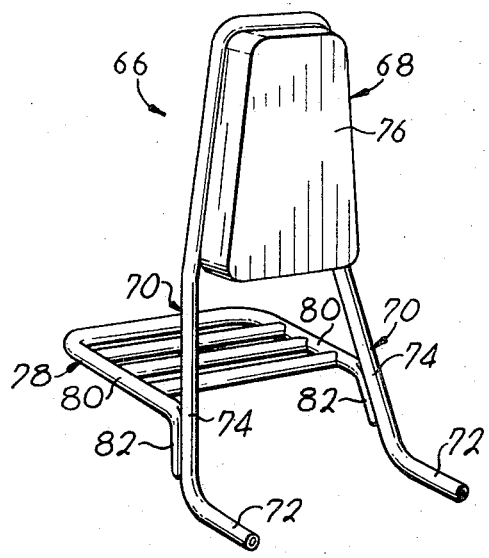
FIG. 2 is a front perspective view of a combination passenger backrest and luggage carrier accessory component that can be used in lieu of the luggage carrier illustrated in FIG. 1.

FIG. 2 illustrates a third accessory component 66 that may be utilized in lieu of the luggage carrier 32. The component 36 consists of a combination passenger backrest and luggage carrier, the backrest portion 68 thereof being substantially similar to operator backrest 30, with the exception that legs 70 of backrest 68 have forwardly extending lower sections 72 instead of rearwardly extending sections 42. The normally vertical sections 74 of legs 70 extend upwardly from lower sections 72 and carry a pad 76.

The luggage carrier portion 78 of component 66 is similar to carrier 32, although the opposed legs 80 of carrier 78 are provided with downturned stretches 82 that complementally receive and are secured to the rear of vertical sections 74 of backrest 68.

It is to be understood that yet a fourth accessory component could be provided, although not shown, consisting solely of a backrest for the passenger without a luggage carrier. Such backrest would be identical to backrest portion 68 of combination component 66.

It should be apparent that in use any combination of the components 30, 32 and 66 can be placed upon the motorcycle 12. For example, the assembly 10 could be arranged as illustrated in FIG. 1 wherein the operator of motorcycle 12 is provided with the backrest 30 and the luggage carrier 32 for any equipment he might desire to carry with him. When the legs 38 of backrest 30 are inserted fully within the tubes 34, the backrest 30 is well retained by tubes 34, even without the assistance of the setscrews 56. It will be noted in this respect that any rearward force applied to backrest 30 by the operator positioned ahead of the latter on seat 18 only causes the legs 38 to be pushed even further into tubes 34, hence precluding any possibility of the backrest 30 becoming detached from tubes 34. Depending upon his own personal preference, the operator may desire to adjust the fore-and-aft position of backrest 30 with regard to seat 18 and this can be readily accomplished by simply tightening setscrews 56 into the dimple 58 corresponding to the selected adjusted position.

In the event that the operator does not desire the use of backrest 30 at all, he can readily remove backrest 30 from motorcycle 12 by simply releasing setscrews 56 if they are tightened, and then withdrawing legs 38 from tubes 34. The backrest 30 can then be set aside while the tubes 34 remain in place on frame 14. Should the operator later decide to replace backrest 30, he need only reinsert legs 38 into tubes 34.

When the operator does not desire to carry a passenger, he is most likely to use the luggage carrier 32 to support extra equipment that he might be carrying, particularly when cross-country travel is anticipated. Mounting of the carrier 32 in place is very easily accomplished, as with backrest 30, by simply inserting the legs 60 of carrier 32 into the rear ends 54 of tubes 34 and then tightening the retaining screws 62 so that they are properly seated within the dimples 64. If it is later desired to remove carrier 32, such can easily be accomplished by merely loosening screws 62 and withdrawing legs 60 from tubes 34.

When a passenger is to be carried on motorcycle 12, especially on long trips, the combination component 66 is more appropriate than the carrier 32. Accordingly, the carrier 32 is removed from tubes 34 and the legs 70 of combination component 66 inserted into rear ends 54 of the tubes 34. Thereupon, the retaining screws 62 are tightened to engage mating dimples (not shown) in the forwardly extending sections 72 in the same manner as with carrier 32. When the component 66 is in place, the backrest 68 thereof will extend upwardly from seat 18 at the rear thereof in spaced relationship behind the operator backrest 30, and the luggage carrier 78 of component 66 will project rearwardly from seat 18 behind backrest 68.

It should thus be apparent that the tubes 34 provide the highly desirable flexibility that has heretofore been lacking in conventional accessory assemblies. The operator of the motorcycle 12 can use any of the accessories above described as he chooses and in any combination, or he may elect to forego using any of the accessories in a given situation, leaving the mounting tubes 34 in place upon the motorcycle 12 without any accessories projecting outwardly therefrom. It will be recognized that the tubes 34 alone in no way interfere with operation of the motorcycle 12 so that they can simply be left intact upon frame 14 when no accessories are to be used. It will also be recognized that once having acquired the tubes 34, they can be readily mounted upon an existing motorcycle. It is only necessary for the operator to loosen or remove the bolts 24 and 28 an appropriate amount to allow the mounting lugs 44 and 46 to be properly positioned. When the bolts 24 and 28 are then re-tightened, the tubes 34 are rendered essentially permanently affixed to frame 14.

Another important consideration is that the tubes 34 permit a single size of the accessory components 30, 32 and 66 to be used for all sizes of motorcycles. Because the legs of each of the components straddle the seat 18 for connection to the frame 14 on opposite sides thereof, it would normally be necessary to provide a spacing between the legs that corresponds with the space between the bolts 28 on opposite sides of motorcycle 12. This means that substantial inventory costs could be incurred by stocking accessory components having legs that properly fit the various motorcycles presently available. However, by using the tubes 34, the spacing between the legs of the various accessory components can be maintained constant, regardless of the size of the motorcycle involved, because it is only necessary to vary the dimensions of the lugs 44 and 46 sufficiently to compensate for the size of the motorcycle involved. In other words, it is only necessary to design the accessory components to accommodate the widest motorcycle while having an assortment of tubes 34 provided with variously sized lugs 44 and 46 to accommodate other motorcycles narrower than the one of maximum width. In this manner, the items which must be supplied most heavily for inventory purposes is the least costly of the items involved, thereby significantly lowering overall inventory costs and thus reducing the final cost to the consumer.

Having thus described the invention, what is claimed as new and desired to be secured by Letters Patent is:

1. For use with a vehicle having a wheel-supported, fore-and-aft extending frame and a seat mounted on said frame, an accessories assembly including:
   a first accessory component comprising a backrest for the operator of the vehicle adapted to extend upwardly from said seat and having a pair of legs spaced apart for disposition on opposite lateral sides of said frame;
   a pair of mounting members removably receiving said legs in telescoping relationship thereto;
   means for affixing said members to said frame on said opposite sides thereof whereby to permit selective removal and replacement of said operator backrest from the vehicle while said members remain in place thereon; and
   a second accessory component having spaced-apart legs,
   said mounting members removably receiving the legs of said second component in telescoping relationship thereto simultaneously with those of said operator backrest.

2. An accessories assembly as claimed in claim 1, wherein said members are hollow, having bores for insertion of said legs thereinto.

3. An accessories assembly as claimed in claim 1, wherein said second component comprises a luggage carrier extending rearwardly from said seat.

4. An accessories assembly as claimed in claim 1, wherein said second component comprises a backrest for a passenger on said vehicle, said passenger backrest extending upwardly from said seat behind the operator backrest.

5. An accessories assembly as claimed in claim 4, wherein said passenger backrest is provided with a luggage carrier secured thereto and projecting rearwardly therefrom.

6. For use with a vehicle having a wheel-supported, fore-and-aft extending frame and a seat mounted on said frame, an accessories assembly including:
   a first accessory component comprising a backrest for the operator of the vehicle adapted to extend upwardly from said seat and having a pair of legs spaced apart for disposition on opposite lateral sides of said frame;
   a pair of mounting members removably receiving said legs in telescoping relationship thereto;
   means for affixing said members to said frame on said opposite sides thereof whereby to permit selective removal and replacement of said operator backrest from the vehicle while said members remain in place thereon,
   each of said members comprising a tube having a pair of opposed, open ends,
   said legs being inserted into one end of the tubes; and a second accessory component having a pair of spaced-apart legs,
   said legs of the second component being removably inserted into the ends of said tubes opposite the operator backrest.

7. An accessories assembly as claimed in claim 6, wherein said second component comprises a luggage carrier projecting rearwardly from said seat behind said operator backrest.

8. An accessories assembly as claimed in claim 6, wherein said second component comprises a passenger backrest projecting upwardly from said seat behind the operator backrest.

9. An accessories assembly as claimed in claim 8, wherein said passenger backrest is provided with a luggage carrier secured thereto and projecting rearwardly therefrom.

10. An accessories assembly as claimed in claim 6, wherein said affixing means for each tube includes a pair of mounting lugs spaced apart along the length of the tube and a fastener for securing each lug to the frame.

11. An accessories assembly as claimed in claim 6, wherein said affixing means are disposed to mount said tubes on said frame in normally fore-and-aft, horizontally extending, parallel relationship with one another.

12. An accessories assembly as claimed in claim 11, wherein each leg of the operator backrest is generally L-shaped, having a normally vertical section and a normally horizontal section extending rearwardly from said vertical section into the proximal open front end of its tube.

13. An accessories assembly as claimed in claim 12, wherein said second component comprises a passenger backrest spaced behind said operator backrest, each leg of said passenger backrest being generally L-shaped having a normally vertical section and a normally horizontal section extending forwardly from said vertical section into the proximal open rear end of its tube.

14. An accessories assembly as claimed in claim 6, wherein each of said tubes is provided with releasable means adjustably holding the legs in selected positions of extension from the opposite ends of the tubes.

* * * * *